United States Patent [19]
Guyer

[11] 3,815,491
[45] June 11, 1974

[54] COOKER

[76] Inventor: Elbert J. Guyer, c/o Moridge Manufacturing, Moundridge, Kans. 67354

[22] Filed: Nov. 22, 1971

[21] Appl. No.: 200,822

[52] U.S. Cl................... 99/468, 99/348, 99/476, 99/479, 99/480, 99/481, 99/483, 99/484
[51] Int. Cl. ... A23n 15/00, A23n 9/00, F47j 44/02, F24c 3/12, F24c 15/20
[58] Field of Search ............................ 99/468–479, 99/483–484, 348

[56] References Cited
UNITED STATES PATENTS

| | | | |
|---|---|---|---|
| 1,981,603 | 11/1934 | Mustonen | 99/468 X |
| 2,312,339 | 3/1943 | Jones | 99/468 X |
| 2,361,151 | 10/1944 | Reed | 99/468 X |
| 3,041,958 | 7/1962 | Abrams | 99/468 X |
| 3,112,917 | 12/1963 | Woerner | 99/348 X |
| 3,245,801 | 4/1966 | Van Der Kulk | 99/468 X |
| 3,261,690 | 7/1966 | Wayne | 99/468 X |
| 3,285,157 | 11/1956 | Smith | 99/478 X |
| 3,703,861 | 11/1972 | Slack | 99/468 X |
| 3,718,322 | 2/1973 | Skelton | 432/105 X |
| 3,749,382 | 7/1973 | Thompson | 432/105 X |

Primary Examiner—Wayne A. Morse, Jr.
Attorney, Agent, or Firm—John H. Widdowson

[57] ABSTRACT

A cooker receives material from an auger and cooks same by circulating the material preferably while stirring same in a cavity or zone having heating air passed and recirculated through the cooking zone and the material. It has an inner perforated vessel surrounded by a second perforated vessel spaced from an outer imperforate vessel. An auger moves the material in a vertical fashion through the inner vessel and disperses and circulates same through the cooking zone between the inner vessel and the second vessel and is used to remove grain from the cooker. Heat is supplied to fresh air and preferably recirculating air from between the second vessel and the outer vessel, and the resulting heated air is forced into the inner vessel. It then passes outwardly through the inner perforate vessel and heats and cooks the material in the cooking zone, and then passes out through the second perforated vessel.

5 Claims, 4 Drawing Figures

INVENTOR
ELBERT J. GUYER

BY John H. Widdowson
ATTORNEY

INVENTOR
ELBERT J. GUYER
BY John H. Widdowson
ATTORNEY

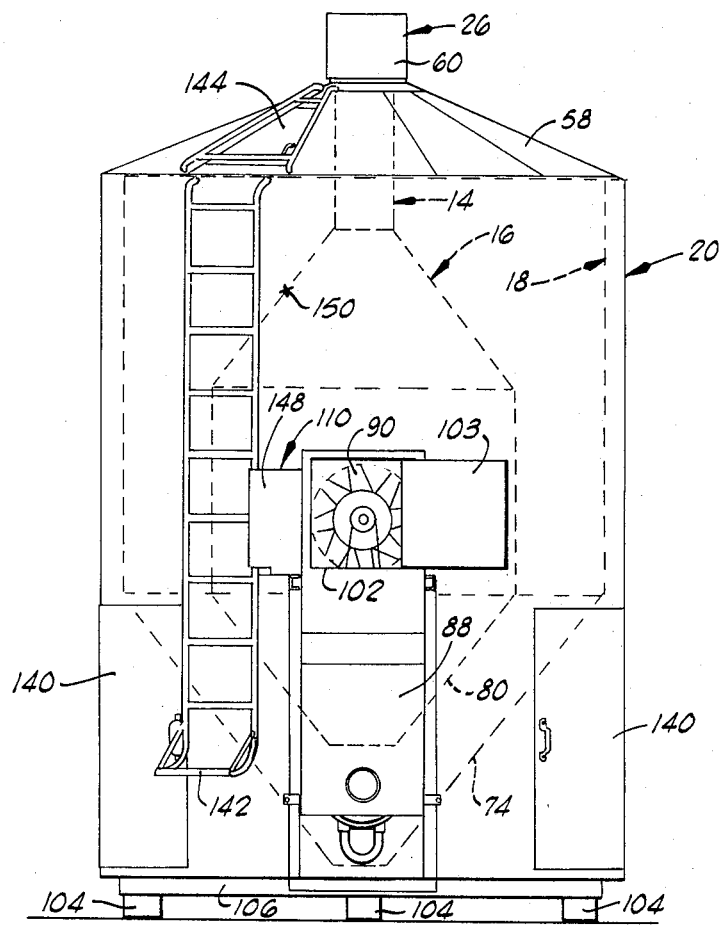
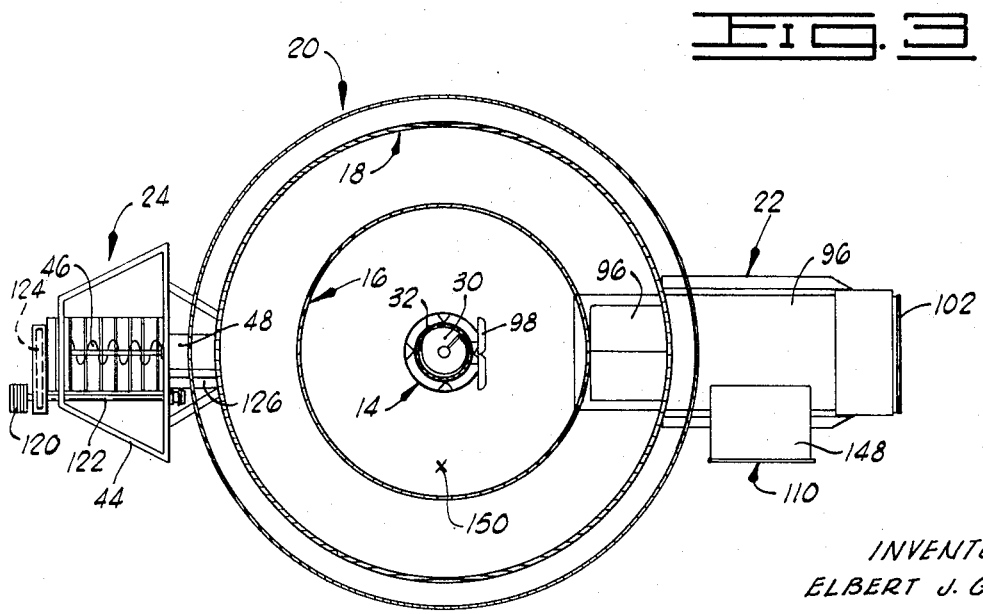

COOKER

Numerous types of cooking devices and methods are known in the prior art as operable to receive grains and other materials and cook same in a continuous operation, or in large batch type operation. However, the prior art devices accomplish this cooking by circulating the grain in an auger-conduit circuit and by using steam as a principal means of applying heat to the material, which is not always desirable depending upon the type and amount of grain cooked. The cooking of grain by using steam is a relatively expensive operation due to a large amount of equipment necessary to inject the steam and the high cost of producing the steam and maintaining a sealed system. Additionally, cooking grain by using steam presents a problem in accurately controlling the moisture content of the material cooked so that it will not swell or clog the cooking apparatus when it absorbs too much moisture. The devices used to cook grain in batches where cooking is done by steam must first cook the material then continue to operate so as to dry the material to the proper moisture content before discharging it which is a time consuming and expensive operation.

In one preferred specific embodiment of this invention, a cooker structure includes a pair of perforated vessels with an auger disposed vertically through them adapted to circulate grain in the space between the vessels with the structure constructed so as to have the heated air forced into it so as to pass through the inner vessel, through the grain, through the second vessel, and back into the inner vessel through a heating apparatus. Specifically, the structure includes a perforated inner vessel with an auger disposed vertically extending through it and a second perforated vessel around the inner vessel spaced a substantial distance away from it, both of the vessels being enclosed in an outer vessel or housing, and having the heating device on the outside of the housing adapted to receive air from the lower portion of the housing and force it through a passageway into the inner cavity of the inner vessel in a recirculating manner. The outer vessel or housing is preferably constructed of an imperforate material so as to hold heat inside of it and to retain the heated air. The inner vessel is preferably constructed circular in the center portion and conical end portions with the auger disposed axially and vertically through it extending the height of the housing. The second vessel is preferably constructed circular in its center portion and encloses the center and upper portions of the inner vessel and it has a conical lower portion to enclose the lower conical portion of the inner vessel. The auger portion of the cooker has an agitator in the bottom portion thereof in the space between the inner and second vessels to agitate and mix the material, and an inlet auger separate from the vertical auger but connected to it used to feed grain into the device. Grain is discharged from the top of the housing at the vertical auger's upper end through a controllable valve. The heating device utilizes a blower and preferably a gas fired heater to burn all the oxygen from the air before it enters the inner vessel so that air is sufficiently heated to cook the grain yet does not have enough oxygen so that the grain will ignite in the high temperature atmosphere. The cooker of this invention is constructed so that it can cook grain in substantially large batches and can be easily unloaded and loaded to provide a substantially continuous type operation.

The associated cooking method of this invention includes charging the cooker structure with material, circulating material with the vertically disposed auger, passing heated air through the inner vessel, through the material, through the second vessel, through a heater and discharging cooked material from the structure. The cooking method of this invention is easily understood by the following description of the cooker structure, its elements and its operation.

One object of this invention is to provide a cooker structure overcoming the aforementioned disadvantages of the prior art devices.

Still, one other object of this invention is to provide a cooking method using a forced air heating system to cook the grain preferably in a substantially oxygen-free atmosphere so that grain can be cooked at a maximum rate and so the moisture content of the grain can be controlled relatively accurately in a batch type cooking operation.

Still another object of this invention is to provide a cooker structure having a perforate inner vessel positioned in a grain flow to receive and pass heated air to accomplish cooking of the grain in a substantially oxygen-free atmosphere.

Yet, one other object of this invention is to provide a cooker structure having an outer vessel or housing enclosing an auger centrally positioned vertically extending through a perforated inner vessel and a perforated second vessel with the second vessel spaced between the inner vessel and the housing and having means to recirculate heated air between the housing and the inner vessel to cook grain.

Various other objects, advantages, and features of this invention will become apparent to those skilled in the art from the following discussion, taken in conjunction with the accompanying drawings, in which:

FIG. 3 is a side elevation view of the cooker structure taken from the heater side, with the inner and second vessels outlined in dashed lines; and FIG. 4 is a top plan view of the cooker structure in cross-section taken through the center portion of the cooker structure above the heater.

Figure 1:
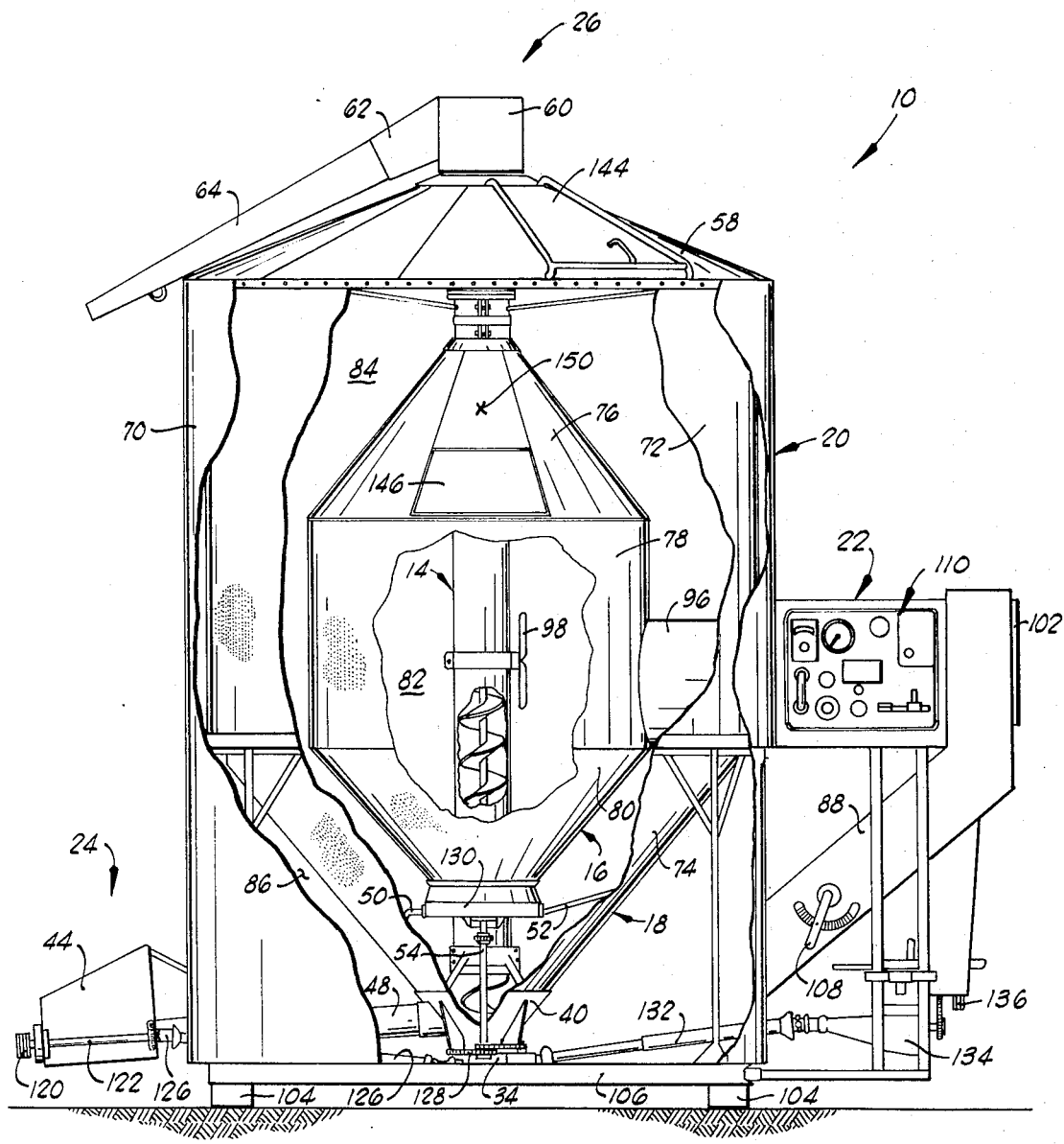
FIG. 1 is a side elevation view of the cooker structure with a portion cut away through the outer housing, the second vessel, the inner vessel, and the vertical auger to show the internal configuration of the cooker.

The following is a discussion and description of preferred specific embodiments of the cooker concept of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular to FIG. 1, the cooker structure of this invention, indicated generally at 10, is shown in a cut away view exposing the inside thereof. The cooker structure 10 includes a vertical auger 14 through the center of the structure, having an inner vessel 16 around it, and spaced from a second perforated vessel 18, all of which is enclosed in an outer vessel 20. The cooking zone is formed in the space between the inner and second vessels. A heating device 22 provides a flow of heated air used in cooking. An inlet auger 24 is used to move grain into the cooker structure, and an outlet spout apparatus 26 is used to remove grain from the cooker after cooking.

Figure 2:
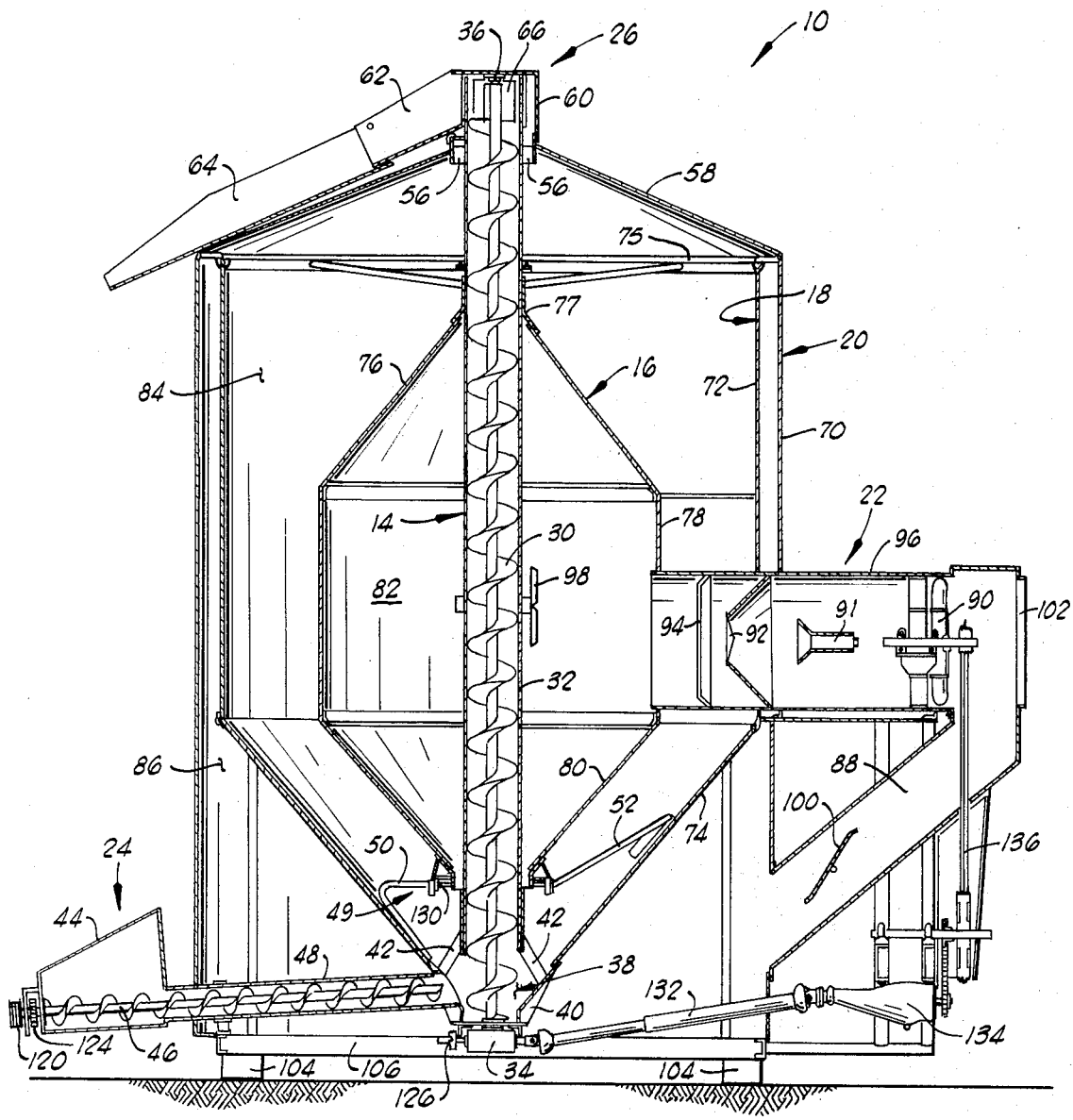
FIG. 2 is a cross-sectional side elevation view of the cooker showing the augers, the vessels, and the heating apparatus.

The augers 14 and 24 are used to move grain into and circulate grain through the cooker when in use. FIG. 2 clearly shows the relationship of the augers 14 and 24 and their position in the cooker 10. The vertical auger 14 has an elongated flighting 30 enclosed in a conduit 32 and mounted at its gear drive 34 in the base of the cooker extending to the outlet spout apparatus 26 where it is pivotally mounted at 36. The vertical auger 14 forms the restricted zone in which material to be cooked is moved upward in vertical circulation in the cooker. The auger conduit 32 is open on the lower end to receive material from the space between the inner vessel 16 and a second vessel 18; this receiving area is indicated at 38. Around the receiving area 38 a conical shaped connecting section 40 joins the inlet auger 24 to the space between the inner vessel 16 and the second vessel 18 and provides the inlet for the vertical auger 14. The lower end of the vertical auger 14 is supported by several braces as shown in 42. The inlet auger has a hopper 44 with an auger flighting 46 from it enclosed in a conduit 48 extending to the receiving area 38. The inlet auger 24 is driven along with the vertical auger 14 and other parts of the cooker as will be described, since it is only used for charging of the cooker. Another element of the auger apparatus of the cooker is the agitator 49 as shown in the space between the inner and second vessels immediately above the receiving area 38. The agitator 49 has a pair of elongated and shaped bars 50 and 52 which in operation rotate about the end of the inner vessel to agitate material passing into the receiving area 38. The agitator 49 is driven by a vertical shaft 54, visible in FIG. 1. In the cooking operation, as will be described, the vertical auger 14 carries grain from the receiving area 38 vertically through the center portion of the inner vessel 16 and discharges it through the outlet spout apparatus 26 via outlet passageways 56 back onto the inner vessel.

The outlet spout assembly 26 is used to control material flow from the vertical auger 14 to recirculate it in the cooker or to discharge it from the cooker. The outlet spout apparatus 26 is mounted on the top portion 58 of the outer vessel 20 as can be seen in FIGS. 1, 2 and 3. FIG. 2 shows in detail the construction of the outlet spout apparatus 26, positioned to recirculate grain inside the cooker. The outlet spout apparatus 26 has a direction controlling housing 60 mounted on top of the upper vessel portion 58 with an attached discharge passageway 62, and another longer attached passageway 64. The direction control housing 60 has an aperture in its upper portion indicated at 66; this aperture aligns with another aperture in the auger conduit 32, and when in one position aligns with one aperture in the vertical housing conduit 32 so as to allow material to move from the auger flighting 30 into the attached discharge passageways 62 and 64 thereby exitting the cooker 10. The outlet aperture 66 in another position aligns with another aperture in the vertical auger conduit 32, not visible in the drawings, to allow material to pass from the auger flighting 30 through the apertures into the recirculating passageways 56 to be recirculating inside the cooker structure. To change positions of the outlet spout apparatus 26 it is manually rotated 90 degrees from the position shown in the drawings. In practice the outlet spout apparatus as described has been found to function quite well in controlling grain or other material in the cooker.

The outer cooking vessel 20 forms an insulative covering for the inner vessels and substantially encloses the apparatus to protect it from loss of heat and allow closed recirculating airflow to be maintained, which is necessary for proper operation of the cooker 10. The outer vessel 20 includes an upright cylindrical sidewall 70 with a conical top 58, preferably constructed of sheet metal or like material. The second vessel 18 is constructed of a perforated type material preferably the type utilizing uniformly patterned holes; it includes a cylindrical sidewall indicated at 72 and a conical lower portion indicated at 74 connecting the vertical sidewall 72 to the receiving area connecting section 40. The upper portion of the second vessel sidewall 72 is attached to a ring-like support 75 at the upper junction of the outer vessel sidewall 70 and the top 58, so as to provide an open top portion for the second vessel. Material discharging from the outlet passageways 56 of the outlet spout apparatus 26 falls into the second vessel 18 and on top of the inner vessel 16. The inner vessel 16 is preferably constructed of the same type perforate material as the second vessel 18. The inner vessel 16 has a conical upper portion 76 attached to the vertical auger conduit slightly below the top of the second vessel 18 as is indicated at 77; it has a cylindrical sidewall 78 through its center portion, and a conical bottom portion 80 extending to the agitator 49 which is attached to the vertical auger conduit 32 immediately above the receiving area 38. The inner vessel 16 is so arranged around the vertical auger conduit 32 so that the vertical auger conduit 32 passes through the apexes of its conical ends 76 and 80. The perforated construction of the inner vessel 16 and the second vessel 18 is an important feature of this invention; it allows heated air to move from the heating apparatus 22 through the cavity of the inner vessel 16, through cooking material, through the second cavity between the inner vessel and the second vessel, and into the outer cavity between the second vessel 18 and the outer vessel 20. The inner vessel cavity is indicated at 82; the second vessel cavity at 84 and the outer vessel cavity at 86. Air passes from the outer cavity 86 into the return air conduit 88 of the heating apparatus 22 and on into it to be reheated and recirculated through the cooker.

The heating apparatus 22 includes an air return conduit 88 from the outer cavity 86, a blower 90, a burner 91, flame deflectors 92 and 94, and a burner housing 96. An additional flame and hot air deflector 98 is attached to the vertical auger conduit 32 as can be seen in FIG. 2. The burner housing 96 extends from the cooker 10, specifically from the inlet vessel sidewall 78 outward through the second vessel 18 and the outer vessel 20 and extends a distance outside of that. The air return conduit 88 is provided with a damper 100 as can be seen in FIG. 2, and utilized to control the amount of returning air to the heating apparatus 22. The blower 90 is mounted on the outer end portion of the burner housing 96 and is preferably remotely belt driven. The blower 90 pulls air through the air return conduit 88 and through a fresh air vent indicated at 102 on the end of the burner conduit 96. The burner 91 is mounted directly downstream of the blower 90 and is preferably a gaseous fluid type burner. The flame deflectors 92 and 94 are supported in the center of the burner housing 96 and are adapted to disperse the flame and to straighten the air as it moves from the burner housing 96 into the inner cavity 82. The hot air flame deflector 98 on the vertical auger 14 is used to prevent undue heating of material as it passes through the center portion of the inner cavity 82. Practice has shown that the deflector 98 is essential to operation of the cooker when used at high temperatures and works best when formed in a circular shape. In practice it has also been found that the burner 91 can be either a natural gas type burner or a liquid petroleum gas type burner. Both types of burners will provide adequate heat for the cooking operation. The specific choice of burner and fuel may be varied by the user as per his specific needs and the availability of fuel.

It should be noted in describing the ventilating system of the cooker 10 that the cooker is adapted to be supported above the ground slightly on blocks indicated at 104 positioned about the underside of the cooker structure 10 on its lower supporting member 106 in order to allow some air to be passed from the outer vessel 20 underneath the structure through the outer cavity 86. Removal of some of the heated air is necessary to properly control the burning and to control the moisture content of the cooked material. In optimum operation of the cooker 10 the burner 91 burns substantially all of the oxygen from the air passing through the burner conduit 96 before it enters the inner cavity 82; this precludes any combustion of material inside the cooker. In order to establish this complete combustion of the air mixture passing into the inner cavity 82, the damper 100 and the fresh air inlet 102 must be adjusted to a suitable operating flow rate for each material cooked to provide the proper temperature and allow for the proper moisture content in the grain or other material. Proper adjustment of the fresh air inlet 102 and damper 100 allow for some of the heated air to escape the cooker 10 through the outer cavity 86 underneath the structure. In practice it has been found that the damper is best controlled by a manual adjustment indicated at 108 in FIG. 1; and the fresh air inlet 102 constructed as a removable sliding or opening door 103 attached to the outer end of the burner housing 96. In order to maintain safe and efficient operation of the cooker 10 of this invention, a set of automatic controls indicated at 110 in FIG. 1 are provided to control the burner flame and monitor temperature inside the cooker structure.

The drive apparatus of the cooker 10 of this invention is adapted to be powered from the power takeoff of a tractor or similar vehicle. The power takeoff is connected to only one input on the cooker structure 10 and utilized to operate the inlet auger 24, the vertical auger 14, and the blower 90. This powering arrangement enables the cooker 10 to be used when only one power takeoff source is available. In practice it has been found practical to construct the cooker 10 of this invention, to be used with an auxiliary powering unit such as the power takeoff of a tractor thereby reducing the construction cost of the overall device and making it more versatile. However, it is to be understood that the cooker 10 of this invention can be constructed having its own independent powering device.

The cooker drive apparatus is fitted with a pulley 120 on the end of an input shaft 122 mounted on the side of the inlet auger hopper 44 as can be seen in FIGS. 2 and 4. The inlet auger 24 is operated continuously by a chain and sprocket arrangement indicated at 124 on the end of the auger hopper 44. The input shaft 122 is directly connected to the pulley 120 and mounted by pillow blocks attached to the side of the inlet auger hopper 44 and connected to an intermediate shaft 126 that is connected to the gear box 34 located beneath the vertical auger 14, as can be seen in FIG. 2. The gear box 34 operates the vertical auger 14 and the agitator 49; it is directly connected to the auger flighting 30 and has a chain drive 128 operating a vertically positioned shaft 54 alongside the auger 14 extending up to a ring gear 130 on the agitator 49. The agitator 49 is rotated continuously with the auger 14 and is adjustable in speed ratio by changing the sprocket on the lower end of shaft 54. In regard to powering the blower 90, a blower drive shaft 132 is connected between the gear box 34 and a transmission 134 which is mounted below the heating apparatus 22, as can be seen in FIG. 1. The transmission 134 is connected to a belt drive 136 used to rotate the blower 90. The purpose of using the transmission 134 in connection with the blower drive is so that the speed of the blower can be changed in relation to the rotational speed of the auger. Being able to vary the blower speed in relation to the auger speed has been found in practice to be necessary because all grains and other materials which may be cooked in the cooker do not cook at the same rate and cannot be cooked at the same temperature; therefore, the speed at which air moves through the grain is critical and must be accurately controlled. Likewise, the speed at which the grain or other material moves through the cooker is important and must be controlled. Additionally, in practice it has been found that an automobile transmission can be adapted for easy use as the transmission 134 and provides a sufficient variance in gear ratios so that the blower speed can be properly controlled and regulated.

The outside of the cooker structure 10 is preferably constructed of a galvanized material so as to protect it from the weather on the outside and to protect the inside from chemical reaction with grains and other material which may be cooked in the cooker. In order to provide access into the cooker for cleaning, inspection and repair, a pair of access doors 140 are provided on its lower portion as can be seen in FIG. 3. Along with the access doors on the lower portion of the cooker structure 10, a ladder 142 is provided to an upper access hatch 144 through the outer housing top 58. An additional hatch in the cooker is provided into the inner vessel 16 by a hatch indicated at 146 located on the top portion 76 of the inner vessel. The cooker structure 10 of this invention is preferably constructed so as to be left out of doors during use and before and after use. In order to protect the controls 110 from damage due to leaving it out-of-doors, the controls are enclosed in a sealable container, as indicated at 148 which provides protection of the instruments. Additional protection of the cooker is afforded when the fresh air passageway door 103 is closed thereby preventing entrance into the heating apparatus.

In regard to controlling the cooking operation of the cooker 10, it has been found advantageous to monitor the air temperature and the grain temperature inside the cooker structure in the area of the inner vessel 16 as well as monitoring the flame conditions of the burner 91. A thermo-couple temperature probe is provided at 150 as indicated by the "x's" in the drawings on the upper top portion 76 of the inner vessel 16; this probe senses air temperature on the inside of the inner vessel 16 and the grain or cooking material temperature on the outside of the inner vessel and indicates those temperatures at the controls 110. The controls also include a fuel regulator to regulate and control the amount of fuel going to the burner 91 and an automatic shutoff control which will stop fuel flow if the burner should go out or if the blower 90 should stop moving air. In the case where natural gas is used to fire the burner 91, no vaporizer controls may be necessary; however, if liquified petroleum gas is used to fire the burner, additional controls may be necessary for the vaporizer. In conjunction with using liquified petroleum gas practice has shown that it can be easily vaporized by placing a coil of conduit inside of the outer cavity 86. This means of vaporizing the fuel usually has sufficient heat to adequately vaporize the liquid petroleum type fuel before it is injected into the burner 91.

In actual operation of the cooker 10 of this invention, the inlet auger apparatus 24 is used to transfer material into the second cavity 84 until it is approximately one-half to two-thirds full. The exact amount of material loaded into the cooker will depend on the specific material, namely, the type of grain or other material and how much it will expand when cooked. As material moves in through the inlet auger 24, it is carried upward by the vertical auger 14 and falls into the second cavity through the outlet passageways 56 and the outlet spout apparatus 26. The agitator 49 prevents the material from being compressed and compacted into an immovable slug at the bottom of the second cavity 84 by agitation in that area with the two bars 50 and 52. Simultaneously with loading the cooker 10 the heating apparatus 22 can be fired so the cooking zone will be raised to the proper temperature for cooking once it has been loaded. During this time the blower 90 is necessarily operated so as to prevent an undue heat build up in the burner housing 96 and to help aerate the grain in the initial cooking stages. The exact temperatures at which the cooker 10 will operate depends upon the material being cooked. It has been found in practice that the cooker can reach a cooking temperature and maintain a cooking temperature of about 600° F. which has been found more than adequate to cook soy beans and other grains which are normally cooked before using them as feed for animals. Once the cooker is charged with material the controls are used to automatically regulate the proper burner condition so that the grain is cooked at whatever temperature is selected. Periodically during the cooking operation, a sampler device (not shown in the drawings) can be used to extract a small portion of the material from the second cavity 84 for examination to determine its moisture content and its stage of being cooked.

Once the grain has been examined and it is determined that it is properly cooked and ready to be discharged from the cooker structure 10, the outlet spout apparatus 26 is used to remove it. It may be desirable to shut off the burner 91 so no further heat is applied to the grain as it is removed from the second cavity 84; in this case the burner alone is shut off and the blower 90 continues to operate. Operating the blower 90 while the grain is being removed from the cooker 10 acts to prevent compaction in the lower portion of the second cavity 84 by aerating the grain. To facilitate removal of the material from the cooker, the outlet spout apparatus 26 is rotated as described above so that grain moved vertically by the auger 14 is discharged through the discharge spouts 62 and 64 for further handling. Preferably all the cooked grain is removed from the cooker structure 10 before uncooked grain is moved into it for another batch.

In the manufacture of the cooker structure 10 of this invention, it is obvious that the vessels thereof can be constructed of sufficient size to cook a substantially large batch of material at one time, and the heating apparatus 22 can be constructed of sufficient capacity to achieve the end product.

In the practice of the method of this invention, it is seen from the preceding description that same provides a way to cook material with recirculating heated air and control the moisture content without possibility of combustion of the material.

In the use and operation of the cooker 10 of this invention, it is seen that same provides a cooking method and apparatus easily and efficiently usable to cook grains and other materials. The cooker structure is provided with means to accomplish the method of the invention including means to circulate the grain through it in a heated airflow for cooking in an atmosphere which is substantially oxygen free, thus providing for cooking of the material without danger of burning or unduly scorching the material.

As will be apparent from the foregoing description of the applicant's cooker structure and cooking method, relatively simple and easily controllable method and means have been provided to cook a grain or other material in a substantially oxygen-free atmosphere. The cooker structure is simple to use, very economical in operation and may be easily used to cook a wide variety of grain or used to cook other materials.

While the invention has been described in conjunction with preferred specific embodiments thereof, it will be understood that this description is intended to illustrate and not limit the scope of the invention, which is defined by the following claims.

I claim:

1. A cooker comprising:
   a. a perforate inner vessel forming an inner cavity,
   b. a perforate second vessel around said inner vessel forming a second cavity between said inner vessel and said second vessel,
   c. an outer impervious vessel enclosing said second vessel forming an outer cavity between said second vessel and said outer vessel,
   d. an upright auger means adapted to move material within said inner cavity from the lower portion thereof to the upper portion thereof, means to move material to said auger means, and means to remove material from said upright auger means, and
   e. heating means adapted in operation to receive air, heat same and force same into said inner cavity,
   f. said inner vessel has conical upper and lower portions with said upright auger means passing through the apex portions thereof,
   g. said outer vessel has a conical lower portion in alignment with said inner vessel with said auger means passing through the apex portion thereof,
   h. said means to bring material to said auger means is a second auger means in communication with the lower portion of said upright auger means, to pass material from a source outside said cooker to said upright auger means, i. said means to move material from said upright auger means is a directionally controllable conduit means on the upper end portion of said upright auger means, j. a means to stir said material in said second cavity, k. said heating means has a conduit connecting said inner cavity and said second cavity adapted to in operation recirculate heated air from said second cavity through said heating means to said inner cavity, a heating element means, a blower means, and a control means, and said cooker adapted to receive material by said auger means and cook same by said auger means circulating said material through said inner cavity while heated air is being introduced therein.

2. The cooker as described in claim 1, wherein:
a. the walls of said inner vessel are substantially porous and perforated so as to freely pass air therethrough yet prevent passage of material therein to said inner cavity,
b. the walls of said second vessel are substantially porous and perforated so as to freely pass air therethrough yet prevent the passage of material therethrough same, and
c. the walls of said outer vessel are not perforated so as to enclose and insulate said second vessel.

3. The cooker as described in claim 2, wherein:
a. said upright auger means has the flighting conduit thereof open on the lower end portion thereof to receive material from said second auger means and from the lower portion of said second cavity, said auger means is adapted to discharge into the upper portion of said second cavity through said directionally controllable conduit means,
b. said means to stir has a blade rotatably mounted with said inner vessel to move therearound said upright auger means in the vicinity of said lower open portion thereof, and
c. said directionally controllable conduit means has an enclosure therearound the upper end portion of said upright auger means and a discharge conduit to carry away discharged material with means to direct material from said upright auger means to said second cavity or to said discharge conduit.

4. The cooker as described in claim 3, wherein:
a. said heating element means is a burner means,
b. said conduit means has a chamber in communication with said inner cavity containing said burner means and said blower means, and said chamber has a fresh air inlet thereto and another inlet thereto connected to an inlet conduit means in communication with said outer cavity,
c. said inlet conduit means for a controllable damper valve therein, and
d. said control means has means to control air temperature, air volume, and combustible gas content and air passing into said inner cavity by controlling said burner means, said blower means, and inlet conduit means damper valve.

5. The cooker as described in claim 4, wherein:
a. said burner means has a gaseous fluid burner in said chamber and a deflector means downstream of said gaseous fluid burner means to disperse the heat and prevent burning of material in said inner cavity,
b. said burner means is adapted to use substantially all the oxygen from the air prior to its passing into said inner cavity.

* * * * *

UNITED STATES PATENT OFFICE
CERTIFICATE OF CORRECTION

Patent No. 3,815,491　　　　　　　Dated June 11, 1974

Inventor(s) Elbert J. Guyer

It is certified that error appears in the above-identified patent and that said Letters Patent are hereby corrected as shown below:

On the Cover Sheet, in the Abstract,
        line 3, "heating" should be -- heated --

In the Claims:
        Column 10, line 20, "for" should be -- has --.

Signed and sealed this 1st day of April 1975.

(SEAL)
Attest:

RUTH C. MASON
Attesting Officer

C. MARSHALL DANN
Commissioner of Patents
and Trademarks